US005766357A

United States Patent [19]
Packer et al.

[11] Patent Number: 5,766,357
[45] Date of Patent: Jun. 16, 1998

[54] APPARATUS FOR FIBER IMPREGNATION

[75] Inventors: Bradford P. Packer, Logan, Utah; Michael L. Rhodes, Richfield, Minn.; Russell H. Montgomery; Roger D. Holstein, both of Ogden, Utah

[73] Assignee: Alliant Techsystems Inc., Hopkins, Minn.

[21] Appl. No.: 716,027

[22] Filed: Sep. 19, 1996

[51] Int. Cl.⁶ .................................................... B05C 3/12
[52] U.S. Cl. ............................ 118/420; 118/411; 118/428; 118/429; 118/666; 118/674; 118/683; 118/307
[58] Field of Search ................... 118/58, 64, 110, 118/411, 420, 428, 429, 666, 674, 683, 686, 688, 689, 690, 234, 307

[56] References Cited

U.S. PATENT DOCUMENTS

| | | | |
|---|---|---|---|
| 3,989,937 | 11/1976 | Fay et al. | 118/666 |
| 4,132,189 | 1/1979 | Greve et al. | 118/674 |
| 4,431,690 | 2/1984 | Matt et al. | 118/674 |
| 4,565,153 | 1/1986 | Corley | 118/420 |
| 4,569,716 | 2/1986 | Pugh . | |
| 4,578,965 | 4/1986 | Brossman | 118/674 |
| 4,797,686 | 1/1989 | Holder | 118/674 |
| 4,862,713 | 9/1989 | Kutz et al. | 118/429 |
| 4,867,775 | 9/1989 | Cain et al. | 118/689 |
| 4,867,834 | 9/1989 | Alenskis et al. . | |
| 4,869,774 | 9/1989 | Wisbey . | |
| 4,872,619 | 10/1989 | Vaniglia . | |
| 4,877,193 | 10/1989 | Vaniglia . | |
| 4,907,754 | 3/1990 | Vaniglia . | |
| 4,943,338 | 7/1990 | Wisbey . | |
| 4,954,204 | 9/1990 | Grimshaw . | |
| 5,022,952 | 6/1991 | Vaniglia . | |
| 5,045,147 | 9/1991 | Benson et al. | 156/429 |
| 5,110,395 | 5/1992 | Vaniglia . | |
| 5,223,072 | 6/1993 | Brockman et al. . | |
| 5,239,457 | 8/1993 | Steidle et al. . | |
| 5,247,749 | 9/1993 | Bury . | |
| 5,273,614 | 12/1993 | Grimshaw et al. . | |
| 5,290,389 | 3/1994 | Shupe et al. . | |
| 5,366,527 | 11/1994 | Amos et al. | 118/420 |
| 5,397,523 | 3/1995 | Curry . | |
| 5,527,410 | 6/1996 | Taniguchi et al. | 118/420 |
| 5,584,932 | 12/1996 | Clark et al. | 118/674 |
| 5,632,817 | 5/1997 | Hiraga et al. | 118/688 |

FOREIGN PATENT DOCUMENTS 1680850   5/1989   U.S.S.R. ..................... 118/420

*Primary Examiner*—Peter Chin
*Assistant Examiner*—Michael P. Colaianni
*Attorney, Agent, or Firm*—Vidas, Arrett & Steinkraus, P.A.

[57] ABSTRACT

An apparatus for fiber impregnation for use in a fiber placement system is disclosed. Resin is impregnated in the fiber rovings as they pass through a manifold. The manifold includes grooves for the fibers to travel, a reservoir to receive the resin and channels for the resin to flow to the individual fibers for impregnation. A control system measures and monitors the fiber speed and then mixes, pumps and delivers the desired quantity of resin to the tows for impregnation.

15 Claims, 5 Drawing Sheets

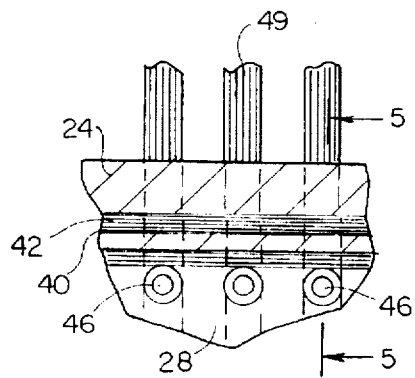
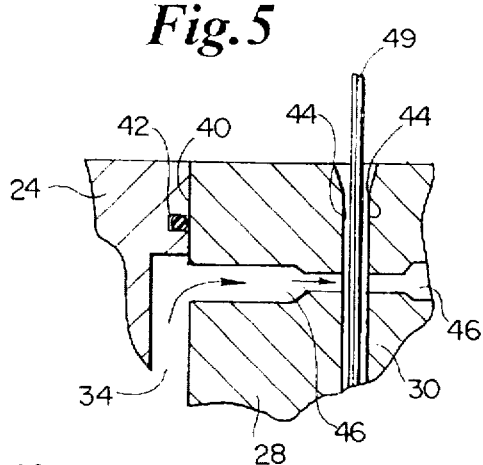
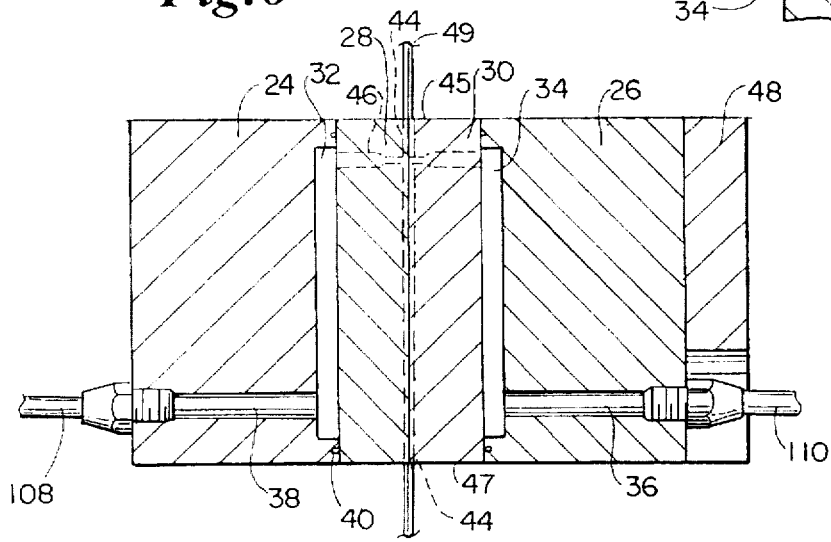
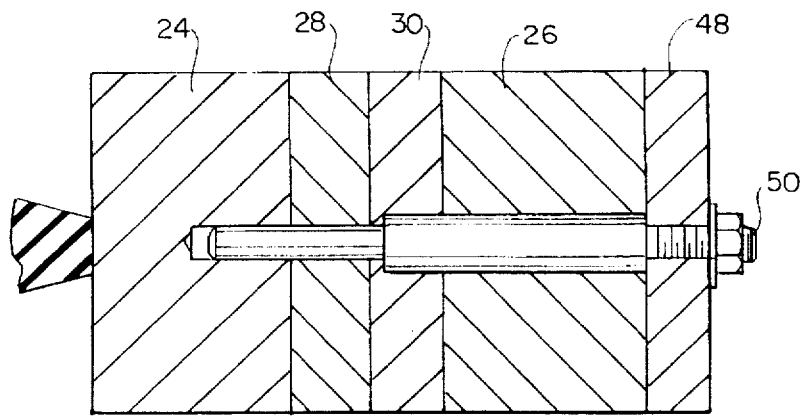

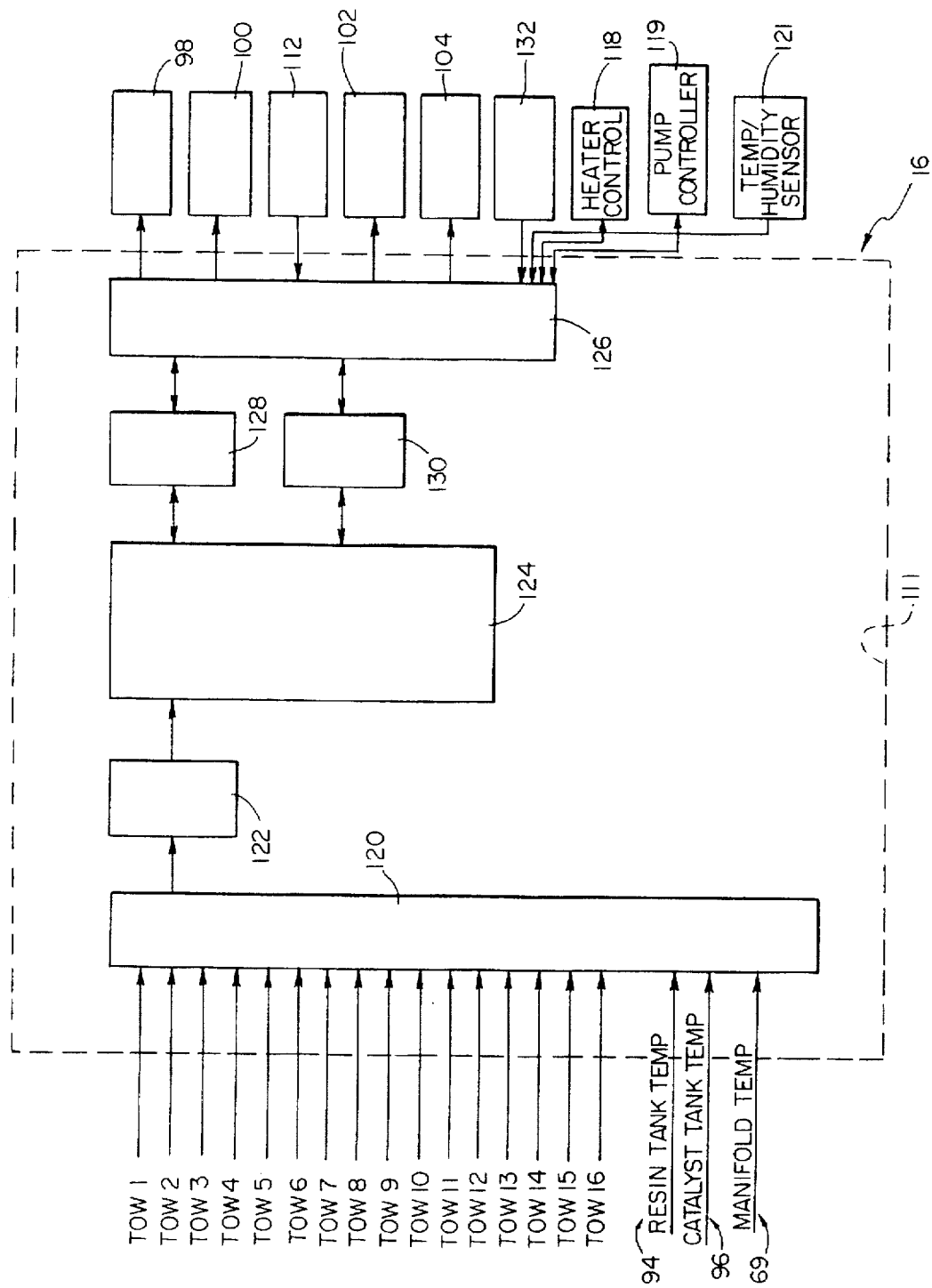

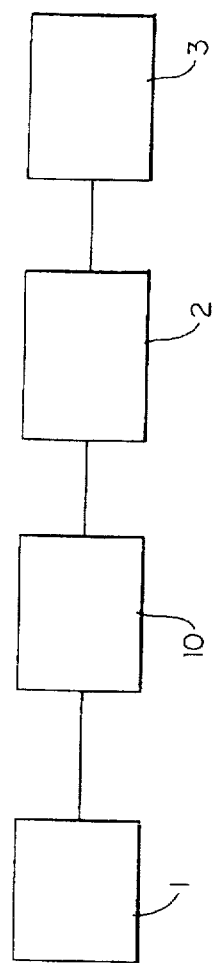

5,766,357

APPARATUS FOR FIBER IMPREGNATION

FIELD OF THE INVENTION

This invention relates to a system for impregnating fiber with a resin and more particularly, to a system for impregnating carbon fiber with a thermosetting resin for use in a fiber placement or filament winding system.

BACKGROUND OF THE INVENTION

In present filament winding systems, fibrous rovings or tows are impregnated with a resin and wound in a desired pattern in a number of superimposed layers onto a mandrel to produce a tubular article. In most systems, the fiber is drawn across an open wheel which dips into a reservoir of manually premixed resin. These systems use a knife blade or doctor blade to control the thickness of the mixed resin layer adhering to the roller. The fiber is impregnated by rolling it across the roller and through the adhering layer.

Other systems used for fiber impregnation include drawing the fiber through a bath of material and then through an opening that sandwiches the fiber between a brass half ring and a rubber plug. Other methods rely on spray guns to spray resin and catalyst onto the fiber. Yet another method of resin impregnation is to advance the resin to a gelled state, spread the resin onto a release paper and roll it to a predetermined thickness. The preformed resin is then applied in sheets on the fiber and the fiber and resin sheets are rolled through a press, thereby impregnating the fiber. Another system utilizes vapor deposition, wherein the resin is mixed with a solvent carrier and applied to the fiber. The solvent is then flashed off leaving the resin on the fiber.

The systems described above have several disadvantages. Setup of these systems can be difficult and time consuming especially when a roller and doctor blade are used for resin impregnation. In these systems, controlling the thickness of the adhering layer is very difficult. The viscosity of resin, which changes over time, and temperature and humidity all affect the adhering layer. Also, the speed and tension with which the fiber is drawn changes the impregnation roller speed which in turn affects the hydraulic pressure of the resin between the doctor blade and the resin impregnation roller. And finally, the doctor blade is set while the system is stopped and cannot be adjusted while the fiber is being drawn over an impregnation roller. Therefore, in systems like this, controlling the doctor blade is very difficult, but is critical to ensuring the proper amount of resin is incorporated into the fiber.

Under prior known systems, the fiber tension and speed have been found to have a profound influence on the amount of resin incorporated into the fibers. Fiber tension and speed can change in a system where the fiber is moved across an open wheel. Since the resin is incorporated through capillarity the amount of resin picked up changes considerably. Also, since the fiber passes over a coated wheel, only the side in contact with the wheel is impregnated with resin. This may lead to poor incorporation into the final manufactured part.

And finally, the resin used in the manufacture of certain articles ages constantly and rather quickly changing its viscosity, especially in situations where the resin is held in an open reservoir at room temperature. Changes in the viscosity of the resin affects the amount of resin entering the fiber by capillarity. To reduce this problem the resin is generally replaced every four to eight hours. Requiring replacement of the resin is wasteful and further requires disposal of unused hazardous materials which is more costly to the manufacturer. Also, the use of the open reservoir for the resin raises environmental issues and issues of safety for workers. Special care and handling of and around the materials is required, which requires very skilled labor and makes the prior known systems very labor intensive and the equipment very difficult to operate.

Therefore, for all of the above reasons, it is desirable to have a method and apparatus for fiber impregnation where the amount of resin to be applied is easily and dynamically controllable, where tension and speed are controlled and do not affect the amount of resin applied, where the fiber is impregnated on all sides, where the resin supply is not subject to aging and wasteful replacement and the system is easy to operate and safer for the environment and for workers.

SUMMARY OF THE INVENTION

An object of the invention is to provide a resin impregnation system whereby fibers are passed through an impregnation manifold and impregnated with a two part organic epoxy-like resin. This invention includes an impregnation manifold and a computer controlled pumping system and fiber monitor to measure the length of fiber drawn through the manifold and mix and meter the resin onto it. The invention allows independent control over the ratio of the resin and hardener as well as control of the weight percentage of mixed resin impregnated on the fibers independent of the fiber speed.

One advantage of the invention is the elimination of the knife blade or doctor blade. The doctor blade is replaced by a computer driven metering system which allows easy manipulation of the resin components for individual applications.

Yet another advantage is the ability to monitor the fiber speed so that the pumping rate may be modified for more accurate results. The present invention accommodates any variety of multi-filament fiber material, and relies on unit length of fiber measured independent of the type of fiber. Therefore, the invention affords the manufacturer great flexibility.

Another advantage is that the invention includes means for applying a positive pressure on the resin such that the resin is actively forced into the fiber rather than relying on capillarity as in the doctor blade arrangement. In this manner, dependence on fiber tension to maintain a steady amount of resin application is negligible. Also, the impregnation manifold of the invention applies resin to both sides of the fiber for superior incorporation.

Another advantage of the invention is that the resin is dynamically mixed as demanded by the movement or speed of the fiber and as a result is never more than a few seconds to a few minutes old. Therefore, there is no resin that is wasted in a reservoir as described above and viscosity and advancement changes are negligible. Furthermore, no more resin is dispensed than is necessary thereby reducing or eliminating waste.

A further advantage of the invention is the minimal handling of materials that is necessary by the operator. The materials are pumped directly from closed, high volume reservoirs and therefore, the handling is quite limited. The invention is highly automated and does not require the highly skilled labor or the labor intensity of the prior systems.

These and other advantages and features which characterize the invention are pointed out with particularity in the claims annexed hereto and forming a further part hereto. However, for a better understanding of the invention, its advantages and objects obtained by its use, reference should be made to the drawings which form a further part hereof, and the accompanying descriptive matter, in which there is illustrated and described a preferred embodiment of the invention.

BRIEF DESCRIPTION OF THE FIGURES

FIGS. 4 is an enlarged fragmentary view of the manifold of the invention taken from area 3 in FIG. 3;

FIG. 5 is a sectional view of the manifold of the invention taken along the line 5—5 of FIG. 4;

FIG. 6 is a sectional view of the manifold of the invention taken along the line 6—6 of FIG. 3;

FIG. 7 is a sectional view of the manifold of the invention taken along the line 7—7 of FIG. 3;

FIG. 8 is a block diagram of the processing and controls of the invention; and

FIG. 9 is a schematic of a fiber placement system.

DETAILED DESCRIPTION OF THE INVENTION

Figure 1:
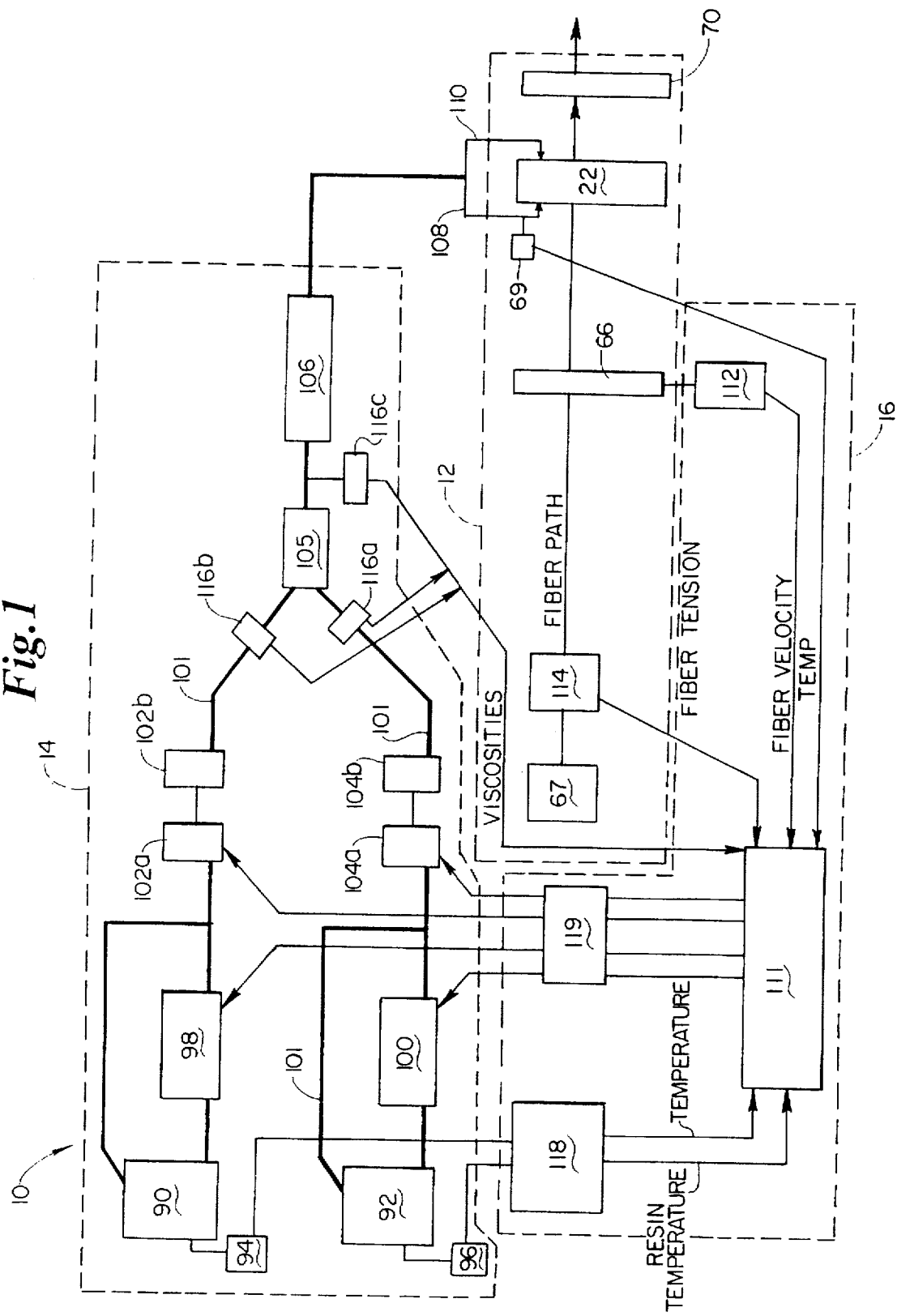
FIG. 1 is a block diagram of the invention.

While this invention may be embodied in many different forms, there are described in detail herein specific preferred embodiments of the invention. This description is an exemplification of the principles of the invention and is not intended to limit the invention to the particular embodiments illustrated.

The invention is a method and apparatus for fiber impregnation and delivery. Different types of fiber are passed through a material metering and impregnation system designed to impregnate the fiber with the correct amount of liquid material per measured unit length of fiber. The invention is designed to be used with a filament winding system or fiber placement machine. FIG. 9 illustrates a schematic of a fiber placement system 1 in which tows or rovings are directed to a fiber impregnation system 10 and delivery head 2. The fiber placement system 1 includes a creel assembly including individual spools upon which the individual tows are wound and from which they are directed to the fiber impregnation system 10 for resin impregnation and then to a delivery head 2 for winding onto a mandrel 3 to form a desired object. The system for fiber impregnation 10 is shown in block diagram form in FIG. 1. The fiber impregnation apparatus 10 includes an impregnation system 12, a mixing and delivery system 14 and a control system 16.

The impregnation system 12, mixing and delivery system 14 and control system 16, as shown in FIG. 1, will be discussed briefly to provide an overview of the invention. The particulars of each will then be discussed in detail. The impregnation system 12 includes fiber spools 67, a load cell 114, a first roller 66, alignment roller 70, temperature probe 69, and an impregnation manifold 22. The path of the fibers through the impregnation system 12 is shown in FIG. 1. Fibers or tows 49 (best seen in FIG. 2) are wound on fiber spools 67 which are known to those skilled in the art and are pulled through the invention by a delivery head 2 of a winding machine 1. The fibers 49 travel from the spools to a first roller 66 where they are guided to the impregnation manifold 22. The fibers enter the manifold 22 where each fiber is impregnated on all sides with the desired type and amount of resin. The fibers 49 then move across alignment roller 70 to the delivery head 2 and ultimately on to a mandrel 3 to form the desired object. The temperature probe 69 monitors the temperature of the resin/catalyst in the manifold 22. The load cell 114 provides a measure of the fiber tension and will be discussed later in this description.

As shown in FIG. 1, the impregnation manifold 22 of the system 12 described above is used in conjunction with a pumping and delivery system 14 and a control system 16. These systems 14 and 16 monitor the fiber to measure the length of fiber drawn through the manifold 22 and mix and meter the resin onto each fiber as desired.

The mixing and delivery system 14 includes heaters and tanks connected to a series of pumps. The pumps are connected to a static mix tube in the preferred embodiment to mix a multitude of components, usually a resin and a catalyst, to be applied to the fiber rovings. If two components are to be used for impregnation, two tanks 90, 92 are utilized with two heaters 94, 96 (if necessary). The invention will be described using two components for the impregnation material. It should be understood that one or a plurality of materials can be used and the associated tanks, etc. are incorporated into the system. The tanks 90, 92 are connected by piping 101 to a series of pumps 98, 100, 102, and 104 which circulate the materials, maintain pump inlet pressure and supply the resin and catalyst in an uninterrupted fashion to a double check valve manifold 105 and then to static mix tube 106. The resin and catalyst are mixed in the static mix tube 106 and then the resin mixture continues to tubing 108 and 110 and into the impregnation manifold 22. A number of viscometers 116 are utilized to monitor the viscosity of the resin and catalyst before and after they come together.

The control system 16 controls the mixing and delivery system 14 and the impregnation system 12. Control system 16 includes a control computer system 111. This control system 111 controls each component of the impregnation material so that the proper ratio of resin and catalyst are mixed and dispensed in the desired amounts to each fiber simultaneously. System 16 also includes a fiber speed sensor or tachometer 112, a heater control 118, and a pump control 119. The tachometer 112 measures the revolutions of roller 66 and provides the rotations to the controls 111 of the invention to determine the speed of the tows. The controller 111 based on a predetermined program then determines the amount of resin/catalyst required per unit length of fiber. The heater control 118 monitors the temperature of the resin and catalyst materials and provides that information to the control system 111. The pump controller 119 then communicates the output from the controller 111 and sets pump speeds based on the algorithm in controller 111. The desired ratio of resin to catalyst and the resin content percent of the impregnated fiber is input to system 111 by the user.

Turning now to a more detailed discussion of the impregnation system 12 and more particularly, the impregnation manifold 22, the manifold 22 is made up of four plates or blocks in the preferred embodiment. The manifold 22 is shown in more detail in FIGS. 2–7. The manifold 22 includes front resin block 24, rear resin block 26, front resin delivery plate 28 and rear resin delivery plate 30. The blocks 24 and 26 are identical in construction but are opposed in position. As shown in FIG. 6, blocks 24, 26 each include a reservoir 32 and 34, respectively. In the preferred embodiment, the blocks 24, 26 are generally rectangular in shape and are made of aluminum or stainless steel. The reservoirs 32, 34 are generally triangular in shape. This triangular shape allows for reservoirs 32, 34 to be adequately filled to supply the resin in an optimal manner, requiring only enough resin for supply to the fibers. Those skilled in the art will understand that other shapes and sizes may be used for various applications. The blocks 24, 26 each further include inlets 36, 38 respectively. The inlets 36, 38 provide an entrance for resin or other material to the reservoir 32, 34.

Referring specifically to FIGS. 4 and 5, each block 24, 26 includes a groove 40 which generally outlines the reservoir 32, 34. The groove 40 is configured to hold an o-ring 42 to form a seal between the blocks 24, 26 and the plates 28, 30 as will be discussed in further detail later in this description.

Referring again to FIGS. 2–7, the resin delivery plates 28 and 30 are identical but opposed. Each plate 28, 30 includes a plurality of grooves 44. The grooves 44 are generally of a semi-circle shape in cross section and extend from the top of the plate 45 to the bottom of the plate 47. The plates 28 and 30 are mated and form a guide for the fiber 49 to travel through as shown more specifically in FIGS. 5 and 6. The grooves 44 of plates 28 and 30 form a passageway which is generally circular in cross section. The grooves 44 can be of various shapes and dimensions as desired for the application. Of course, the number of grooves 44 is determined by the user and application. Further, the plates 28 and 30 include a plurality of channels or conduits 46. The channels 46 are connected to the grooves 44 and form a conduit for resin to travel from the reservoirs 32, 34 to the grooves 44 which hold the fiber 49 to be impregnated. The fiber impregnation will be described in further detail elsewhere in this description. In the preferred embodiment, the channels 46 are larger in diameter adjacent to the reservoir 32, 34 and taper to a smaller diameter adjacent to the grooves 44. It should be understood that the shape and dimensions of the channels 46 is variable depending on the application and desired results. A graphite fiber having 12,000 strands does not require as large of a channel as a graphite fiber having 20,000 strands because a larger fiber requires more resin.

As shown in the Figures, the blocks 24, 26 and plates 28, 30 are connected to form the impregnation manifold 22. As shown in FIG. 7, a manifold support plate 48 is utilized in the preferred embodiment. The plate 48 is adjacent to the resin cavity block 26. The block 26 is adjacent to the delivery plate 30. The delivery plate 30 is adjacent to delivery plate 28. The delivery plate 28 is adjacent to the resin cavity block 24. Plates and blocks 24, 28, 30, 26, and 48 are connected by a locating pin 50. Any conventional means of connecting the plates and blocks may be utilized. It should be understood that the appropriate fittings, bushings and connectors are utilized in the apparatus and are known to those skilled in the art.

Figure 2:
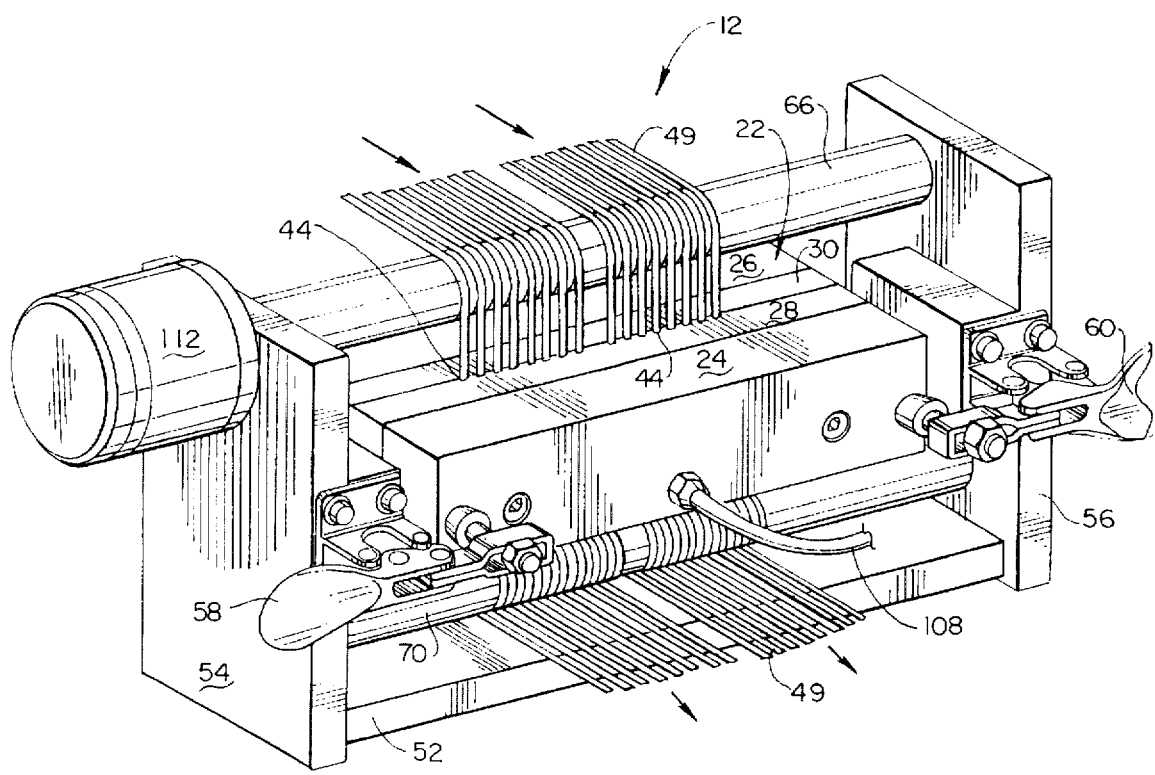
FIG. 2 is a perspective view of the manifold apparatus of the invention.
Figure 3:
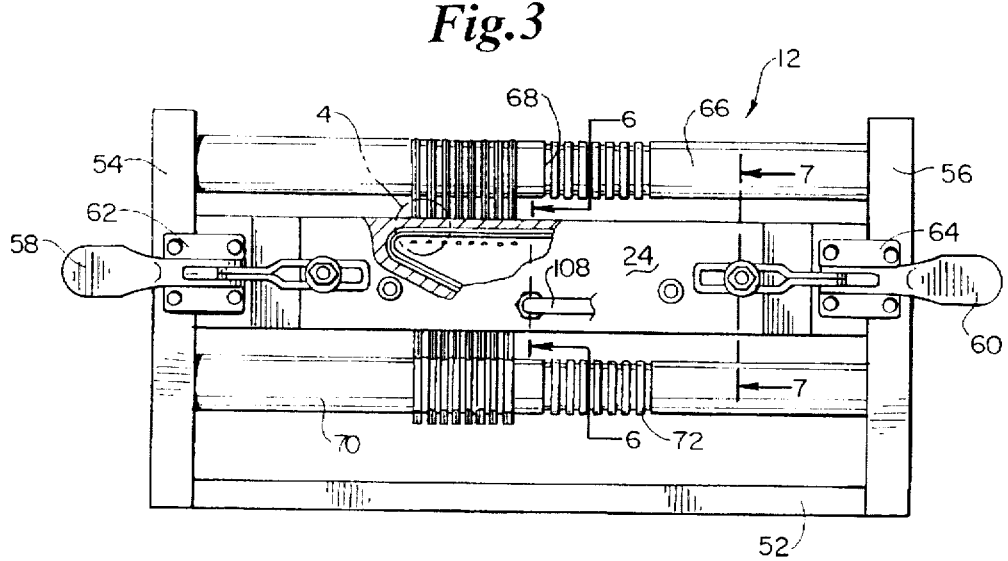
FIG. 3 is a front elevational view of the manifold apparatus of the invention.

Referring now to FIGS. 2 and 3, the impregnation apparatus 12 is shown. The apparatus 12 includes the manifold 22, as described above, and further includes a base 52. The base 52 is connected to side bearing blocks 54 and 56 in the preferred embodiment. The manifold support plate 48 is connected to the side bearing blocks 54 and 56 by conventional means. Further, toggle clamps 58 and 60 are connected to the front resin cavity block 24 and toggle into brackets 62 and 64 which are connected to side bearing blocks 54 and 56. In this manner, the manifold 22 is secured to the base 52 and side bearing blocks 54 and 56. The toggle clamps 58 and 60 allow for easy removal of the manifold front resin cavity block 24, and front and rear resin delivery plates 28 and 30. In this way, the impregnation manifold may be examined, cleaned or changed easily for different applications.

The impregnation apparatus 12 also includes a first roller 66. The roller 66 is connected to side bearing blocks 54 and 56 so that it may freely rotate. The roller 66 includes a plurality of grooves 68. The grooves 68 are configured to receive a fiber or tow 49 and guide the fiber into the manifold 22. The fibers or tows 49 are wound on fiber spools 67 which are known to those skilled in the art and are pulled through the invention by a delivery head 2 of a winding machine 1. A second roller 70 is also utilized in the preferred embodiment. The second roller 70 is connected to the side bearing blocks 54 and 56 so as to freely rotate. The second roller 70 includes a plurality of grooves 72. The grooves 72 are configured to receive fibers 49 which are exiting the impregnation manifold 22 and guide the impregnated fiber from the apparatus 12 to its destination, most likely a series of redirect guiding rollers and the placement delivery head 2 for application to a mandrel 3 to produce the desired article.

A temperature probe 69, shown in FIG. 1, monitors the temperature of the resin/catalyst mix and supplies that information to the controller 111 so that the user can ensure the temperature is within the predetermined appropriate range. The user is alerted if the temperature is out of range.

A load cell 114 may also be used with the impregnation system 12, shown in FIG. 1. The load cells 114, known to those in the art, are cantilever beam force sensors which sense weight and force. The load cells 114 are utilized with a fiber tension control system (not shown) for controlling and providing a measure of the fiber tension. A fiber tension control system is known to the skilled artisan to adjust the tension of the fiber automatically as the spool gets smaller. For this invention, each fiber or tow 49 is monitored for fiber tension for the purpose of gathering data as the winding machine 1 pulls the tows through the manifold 22 for impregnation. The load cell 114 is connected to the controller 111 and provides the fiber tension reading for each fiber. The data gathered helps the user monitor the quality of the product to ensure the part is built to design specifications.

Now the mixing and delivery system 14 will be described. This system 14 mixes and delivers resin to the impregnation manifold 22. In the preferred embodiment both a resin and a hardener or catalyst are utilized to form a two part epoxy-like resin. One example utilized for manufacture of rocket motor cases and other composite structures uses a resin which is an epoxy manufactured under the name EPON 826 or EPON 828 by Shell Chemical Company and a hardener which is Tonox 60/40 manufactured by Uniroyal Chemical. The system has the capability to deliver resin at ambient temperature or at elevated temperatures. Furthermore, while most applications utilize resin in the liquid state, it should be noted that the invention is capable of delivering suspended particulates, if desired. Also, single or multi-component resins may be utilized.

It should be understood that various resins and hardeners may be used in different combinations for different applications. Other appropriate resins include other epoxies, urethanes, vinylester, cyanate ester, polyesters, styrenes, bismaleimide based resins, and filament sizing materials. Other appropriate catalysts or curatives include but are not limited to Anchor manufactured by Air Products and Chemicals, Inc., Jeffamine D-230 manufactured by Huntsman Chemical, and MTHPA (methyl tetrahydrophthalic anhydride) manufactured by Anhydrides & Chemicals. In the preferred embodiment the fibers are carbon fibers. The resins and catalysts can be used with fibers such as carbon, glass, graphite, arimid and other man-made fibers for various applications.

Referring to FIG. 1, the resin and the catalyst are stored for use in resin tank 90 and catalyst tank 92, respectively. Of course, any number of tanks can be used as appropriate for any number of resins and/or catalysts chosen. In the preferred embodiment, each tank 90 and 92 includes a heater 94, 96. In the preferred embodiment, the heaters 94, 96 are heat blankets known to those skilled in the art. It should be understood that heaters are used as desired or necessary and that it is also contemplated that the fluid lines and the manifold may be heated if desired or necessary.

The tanks 90, 92 are each connected to a first stage pump 98, 100. The pumps 98, 100 are gear-type pumps manufactured by Micropump Corporation in the preferred embodiment. Any properly sized rotary pump may be utilized. The gear pumps 98, 100 circulate the contents of the tank and also maintain inlet pressure to the downstream metering pumps so that resin and catalyst may be pumped to the manifold 22 without interruption or cavitation.

The mixing and delivery system 14 also includes another set of pumps 102, 104 connected to the first stage pumps 98, 100. In the preferred embodiment, two sets of precision metering pumps 102a, 102b and 104a, 104b are utilized and their pump strokes arranged such that, in operation, a constant flow of resin and catalyst is provided, with no pulsing. All the pumps (gear and metering) are synchronized and may be controlled by conventional mechanical means or by computer which will be discussed below. These pumps 102a,b and 104a,b are of the positive displacement or piston type manufactured by IVEK Corporation in the preferred embodiment. Any properly sized precision metering pumps would be suitable.

The tanks 90, 92 micropumps 98, 100 and metering pumps 102, 104 are connected by stainless steel or TEFLON tubing or lines 101 known to those skilled in the art. The tubing 101 is connected to a double check valve manifold 105. The check valve manifold 105 brings the lines 101 together and the check valves prevent back flow and mixing until desired. The check valve manifold 105 is connected to a static mix tube 106 with stainless steel or TEFLON tubing. The static mix tube 106 is made of plastic in the preferred embodiment and has a helix pattern on its interior to enhance mixing. The resin and catalyst are mixed in tube 106 due to the motion of the material through the helix pattern in the tube 106. The static mix tube 106 is connected by tubing to the manifold 22. In the preferred embodiment, the tubing from the static mix tube to the manifold 22 is split using a y-shaped tube or splitter. These split tubes or feeder tubes 108 and 110 are connected to resin cavity blocks 24 and 26, respectively. In this manner, the resin/catalyst mix is delivered to each side of each of the manifold 22 and thus to each side of the fibers 49. The delivery will be discussed further in the operation discussion below.

The mixing and delivery system 14 also includes a number of viscometers 116. The viscometers 116a and 116b are in-line viscometers manufactured by Cambridge in the preferred embodiment. Viscometer 116c is a cone plate viscometer of a known type in the preferred embodiment produced by Brookfield Viscometer. The viscometers 116a and 116b measure the viscosity of the individual impregnation materials and viscometer 116c measures the viscosity of the materials after they have been mixed so that the user may monitor the readings to assure the desired viscosity is being maintained before and after mix. The appropriate number of viscometers are used for the desired components to be monitored. Each viscometer 116 is connected to the controls 111 to provide input of the viscosity. In this manner, the viscosity of the material is monitored and may be changed by controlling the heat to the tanks or the heat to the system, for example. If the user detects a catastrophic change in the viscosity from that desired, the system may be shut down to remedy the situation.

Referring now to FIGS. 1 and 8, the invention includes a control system 16. This control system controls the impregnation system 12 and the mixing and metering system 14 so that the proper ratio of resin and catalyst are mixed and dispensed in the desired amounts to each fiber simultaneously. Any number of components may be used in the impregnation material and the number of pumps, tanks, heaters and other equipment utilized will be determined by the number of components used and the desired application. The controls 111 will be described for a system utilizing one resin and one hardener but it should be understood that other embodiments may be utilized. The controls 111 are connected to a pump controller 119 and to the pumps 98, 100 to control the circulation of the resin and hardener components and control the inlet pressure as described above. The pump controller 119 is also connected to pumps 102 and 104. The controls 111 and controller 119 synchronize the pumps 102 and 104 and control the rate of pumping of the components to the static mix tube 106 for dispensing and impregnating the tows under a slight positive pressure so that the resin/catalyst mix is forced into the fiber on both sides.

While not specifically detailed in the Figures, it will be understood that the various electronics, controls, electronic functional blocks and control functional blocks included herein are properly connected to appropriate bias and reference supplies so as to operate in their intended manner. It should also be understood that the processing described herein utilizes well known technology which is connected to appropriate memory, buffer and other peripheral devices so as to operate in their intended manner.

The controls 111 receive a number of different types of information which are utilized to determine the rate of mixing, pumping and dispensing of the impregnation material. The apparatus 10 includes a fiber speed sensor or tachometer 112. The sensor 112 is connected to the roller 66 by conventional means as shown in FIG. 2 and is connected to the controls 111 as shown in FIG. 1. The fiber speed sensor 112 is of a conventional type known to those skilled in the art. The tachometer 112 measures the angular rotation of roller 66 and provides the rotational information to the controls 111 of the invention to determine the speed of the tows.

A heater control 118 is utilized in the preferred embodiment. The heater control 118 is of a conventional type and is connected to the heaters 94 and 96 and to the control system 111 by conventional means. In the preferred embodiment the heater control is of a known type manufactured by Wattlow Inc. The heater control 118 monitors the temperature of the resin and catalyst materials and provides that information to the control system 111. The heater control 118 also controls the heaters 94, 96 so that the materials may be kept at the desired temperatures. The heater control 118 is controlled by the control system 111 to regulate the temperature of the individual components of the impregnation materials.

The control system 111 is shown in more detail in FIG. 8. The control system includes an analog MUX interface 120. In the preferred embodiment a 32 channel MUX board of a known type is utilized. The MUX 120 receives the fiber tension information from the load cell 114 for each tow as shown in FIG. 8. The MUX interface 120 also receives the resin tank temperature and the catalyst tank temperature. If desired, the manifold temperature information is also received.

The MUX interface 120 is connected to an analog to digital converter 122. The data received by the interface 120 is forwarded to the A/D converter 122 which is a part of the computer 124. The A/D converter is standard and the computer 124 is a 486 computer in the preferred embodiment. The computer 124 includes a plurality of interface cards 126, 128, 130. The interface card 126 is designed by Honeywell Inc. of Minneapolis, Minn. and is designed to allow for communication between the control system 16 and the pumps 98, 100 and 102, 104. The interface card 126 also receives the data from the tachometer 112, and includes a multiplier to increase the number of pulses put out by the tachometer 112. The tachometer tells the control algorithm how fast and how much fiber is passing through the system. The computer 124 also includes an interface card D/A converter 128 which is connected to the interface 126 and an interface card counter/timer 130 is connected between the computer 124 and the interface 126. A power supply 132 is also connected to the system 16. The tachometer sends a pulse to the interface 126 and the counter/timer 130 counts and times the pulses to determine the speed of the fibers.

The computer 124 includes specialized algorithms to control the mixing, pumping and dispensing of material to the fibers. In operation, the tows 49 are pulled from fiber spools 49 by a delivery placement head of a winding system across roller 66 through manifold 22. The tachometer 112 provides pulse data to the interface 126 and the timer/counter 130 calculates the fiber speed and provides this speed to the computer 124. Based on a predetermined set of factors defined in the algorithms, the computer 124 through pump controller 119 controls the pumps 98, 100 to circulate the materials and maintain inlet pressure to pumps 102a, b and 104a, b and controls the pumps 102a, b and 104a, b to pump the desired ratio of resin and catalyst to the static mix tube 106 based on the speed of the fiber, resin density, fiber density and the number of tows.

The computer 124 calculates the flow rates of the materials and controls the pumps through controller 119 based on the amount of mixed resin required per unit length of fiber. The fixed ratio of resin to catalyst is entered into the computer by the user as are the number of tows in use and the desired resin content of the fibers. The computer controls the volume of resin pumped. For example, if the resin content is to be increased the program calculates faster delivery by the pumps. In this manner, the invention provides independent real time control over the ratio of resin and hardener as well as control of the weight percent of mixed resin impregnated on the fiber independent of fiber speed. As a result, when winding a helical pattern for example, there are variations in the speed of the tows and the control system 16 compensates for these varying speeds to pump according to the measured speed of the tows and to ensure the proper ratio of resin and hardener is maintained at the various speeds.

The impregnation materials are mixed in the static mix tube 106 and are pumped to the feeder tubes 108 and 110 as demanded by the control system 16 and its particular predetermined factors to prevent chemical advancement. The impregnation material flows through the feeder tubes 108, 110 to the manifold 22. The material enters the reservoirs 32 and 34 of the front and rear cavity blocks 24 and 26. The resin mixture then is pumped into the channels 46 of front and back resin delivery plates 28 and 30. The mixture enters the grooves 44 of the plates 28 and 30 which guide the tows 49 to be impregnated. In this manner, the resin is impregnated into the tows on both sides and the impregnated tows 49 leave the manifold 22 and are guided by roller 70 to a delivery placement head of a winding system in the preferred embodiment.

The fiber tension of each fiber or tow is determined by the load cell 114 and is provided to the computer 124. The resin and catalyst temperatures are monitored by the heater control 118 and the viscosity is monitored by the viscometers 116 and the information is input to the computer 124. The heater control 118 then responds to the control system 16 according to the desired application. The computer control system 16 collects and stores all of the data thereby creating an historical data base of the components of the entire system. This allows direct input to statistical process control that monitors the systems integrity.

The invention can also include components to monitor and maintain the temperature and humidity of the work environment if the application required it. A temperature and humidity sensor 121 of a known type may be added to the system and connected to the control system 111. The temperature and humidity would be sensed and the information sent to the computer 126 so that the user could monitor these factors and additional algorithm elements added to use the information.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is:

1. An apparatus for impregnating a plurality of fibrous tows with a resin in a filament winding system, the apparatus comprising:

(a) a manifold for receiving a plurality of fibrous tows and impregnating the tows with a resin;

(b) a first roller including a plurality of grooves, each groove receiving one of the plurality of fibrous tows, the fibrous tows causing the first roller to rotate as the fibrous tows move over the roller to the manifold for impregnation;

(c) a fiber speed sensor connected to the first roller for determining the speed of the fibrous tows;

(d) a pump system connected to the manifold for pumping resin to the manifold, and (e) a control system connected to the fiber speed sensor and the pump system for controlling the rate the resin is pumped to the manifold based on the fiber speed.

2. The apparatus of claim 1 wherein the manifold comprises:

(a) a block having at least one resin inlet connected to the pump system;

(b) the block further including a reservoir for receiving the resin and connected to the resin inlet;

(c) the block further including a plurality of through channels through which the plurality of fibrous tows move to be impregnated, the through channels being connected to the reservoir so that the resin flows under pressure into the through channels to impregnate the fibrous tows.

3. The apparatus of claim 2 wherein the reservoir is generally triangular in shape.

4. The apparatus of claim 1 wherein the manifold comprises:

(a) a block having a top, bottom, front and back sides and containing a plurality of through channels which extend from the top to the bottom of the block and through which the plurality of fibrous tows move to be impregnated;

(b) the front side and back side of the block each having a respective front resin inlet and back resin inlet, both inlets being connected to the pump system;

(c) the front side and back side each having a respective front reservoir and back reservoir connected to their respective front resin inlet and back resin inlet, both reservoirs being connected to the through channels so that the resin flows under pressure from the front and back sides of the fibrous tows as the tows move through the manifold.

5. The apparatus of claim 4 wherein the front and back reservoirs are generally triangular in shape.

6. The apparatus of claim 1 further comprising monitoring means connected to the pump system for measuring the viscosity of the resin.

7. The apparatus of claim 1 further comprising means for monitoring the temperature of the environment of the apparatus, the means for monitoring connected to the control system.

8. The apparatus of claim 1 further comprising means for monitoring the humidity of the environment of the apparatus, the means for monitoring connected to the control system.

9. An apparatus for impregnating a plurality of fibrous tows with a resin in a filament winding system, the apparatus comprising:

(a) a manifold for receiving a plurality of fibrous tows and impregnating the tows with a resin, the resin having at least two components;

(b) a first roller including a plurality of grooves, each groove receiving one of the plurality of fibrous tows, the fibrous tows causing the first roller to rotate as the fibrous tows move over the roller to the manifold for impregnation;

(c) a fiber speed sensor connected to the first roller for determining the speed of the fibrous tows;

(d) a pump system connected to the manifold for mixing and pumping the resin components to the manifold, and (e) a control system connected to the fiber speed sensor and the pump system for controlling the mixing of the resin components and the rate the resin is pumped to the manifold based on the fiber speed.

10. The apparatus of claim 9 wherein the manifold comprises:

(a) a block having at least one resin inlet connected to the pump system;

(b) the block further including a reservoir for receiving the resin and connected to the resin inlet;

(c) the block further including a plurality of through channels through which the plurality of fibrous tows move to be impregnated, the through channels being connected to the reservoir so that the resin flows under pressure into the through channels to impregnate the fibrous tows.

11. The apparatus of claim 10 wherein the reservoir is generally triangular in shape.

12. The apparatus of claim 9 wherein the manifold comprises:

(a) a block having a top, bottom, front and back sides and containing a plurality of through channels which extend from the top to the bottom of the block and through which the plurality of fibrous tows move to be impregnated;

(b) the front side and back side of the block each having a respective front resin inlet and back resin inlet, both inlets being connected to the pump system;

(c) the front side and back side each having a respective front reservoir and back reservoir connected to their respective front resin inlet and back resin inlet, both reservoirs being connected to the through channels so that the resin flows under pressure from the front and back sides of the fibrous tows as the tows move through the manifold.

13. The apparatus of claim 12 wherein the front and back reservoirs are generally triangular in shape.

14. The apparatus of claim 9 further comprising monitoring means connected to the pump system and control system for measuring the viscosity of the resin.

15. An apparatus for impregnating a plurality of fibrous tows with a multicomponent resin in a filament winding system, the apparatus comprising:

(a) a manifold for receiving a plurality of fibrous tows and impregnating the tows with a resin, the resin having at least two components;

(b) mixing means connected to the manifold for mixing the resin components;

(c) control means connected to the mixing means for controlling the ratio of the components mixed based on a set of predetermined conditions;

(d) a roller for receiving the plurality of fibrous tows, the fibrous tows causing the roller to rotate as the fibrous tows move over the roller to the manifold for impregnation;

(e) a fiber speed sensor connected to the roller for determining the speed of the fibrous tows:

(t) pumping means connected to the manifold for pumping the resin to the manifold; and (g) a control system connected to the fiber speed sensor and the pumping means for controlling the rate the resin is pumped to the manifold based on the fiber speed.

* * * * *

UNITED STATES PATENT AND TRADEMARK OFFICE
CERTIFICATE OF CORRECTION

PATENT NO. : 5,766,357

DATED : June 16, 1998

INVENTOR(S) : PACKER ET AL.

It is certified that error appears in the above-identified patent and that said Letters Patent is hereby corrected as shown below:

Col. 1, before FIELD OF THE INVENTION insert the following:

This invention was made with government support under Cooperative Agreement 70NANB2H1242 awarded by the National Institute of Standards and Technology. The Government has certain rights in the invention.

Signed and Sealed this

Twenty-fourth Day of November, 1998

Attest:

BRUCE LEHMAN

*Attesting Officer*     *Commissioner of Patents and Trademarks*